United States Patent
Brehob et al.

(10) Patent No.: US 6,443,108 B1
(45) Date of Patent: Sep. 3, 2002

(54) MULTIPLE-STROKE, SPARK-IGNITED ENGINE

(75) Inventors: Diana D. Brehob; Todd Arthur Kappauf, both of Dearborn, MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/777,983

(22) Filed: Feb. 6, 2001

(51) Int. Cl.[7] ............................................. F02B 75/02
(52) U.S. Cl. .................................................. 123/64
(58) Field of Search ........................................ 123/64

(56) References Cited

U.S. PATENT DOCUMENTS

| | | |
|---|---|---|
| 3,709,201 A | 1/1973 | Cook |
| 4,143,518 A * | 3/1979 | Kellog-Smith ............... 123/64 |
| 4,237,832 A | 12/1980 | Hartig et al. |
| 4,289,097 A | 9/1981 | Ward |
| 4,354,468 A * | 10/1982 | Sone et al. .................. 123/440 |
| 4,365,603 A * | 12/1982 | Shikata et al. ............... 123/440 |
| 4,641,613 A | 2/1987 | Delesalle |
| 4,736,715 A | 4/1988 | Larsen |
| 4,917,054 A | 4/1990 | Schmitz |
| 4,924,823 A * | 5/1990 | Ogura et al. ................. 123/64 |
| 5,377,631 A | 1/1995 | Schechter |
| 5,598,819 A | 2/1997 | Blackburn |
| 5,699,758 A | 12/1997 | Clarke |
| 5,794,585 A | 8/1998 | Yonezawa et al. |
| 5,806,483 A | 9/1998 | Mitarai et al. |
| 6,026,781 A | 2/2000 | Imatake et al. |
| 6,032,637 A | 3/2000 | Mamiya et al. |
| 6,178,947 B1 * | 1/2001 | Machida et al. ............ 123/396 |

FOREIGN PATENT DOCUMENTS

| | | |
|---|---|---|
| EP | 0 302 042 B1 | 5/1992 |
| EP | 0 578 637 B1 | 2/1995 |
| WO | WO 95/32360 | 11/1995 |

OTHER PUBLICATIONS

SAE Technical Paper Series 941922 "New Concept For Six–Stroke Diesel Engine" Masatake Arai and Kenji Amagai Oct. 17–20, 1994 Fuels & Lubricants Meeting & Exposition (Baltimore, MD).

SAE Paper 199–01–1500 "A Six–Stroke DI Diesel Engine Under Dual Fuel Operation" Kenji Amagai and Masataka Arai.

* cited by examiner

Primary Examiner—Marguerite McMahon
(74) Attorney, Agent, or Firm—Diana D. Brehob; Allen J. Lippa

(57) ABSTRACT

A system and a method for operating an internal combustion engine at a six-stroke, eight-stroke, or greater number of strokes cycle is disclosed. The combustion of the fuel and air is accomplished in two combustion steps with at least one expansion and compression process in between the two combustions, with the second combustion occurring at a stoichiometric air-fuel ratio. The first combustion at lean air-fuel ratio provides high efficiency. The products of the first combustion are subjected to a second combustion event at stoichiometric air-fuel ratio. Consequently, high conversion efficiency of nitrogen oxides in the exhaust aftertreatment device, available at stoichiometric conditions, can be achieved.

20 Claims, 2 Drawing Sheets

4-stroke cycle (prior art)

6-stroke cycle

MULTIPLE-STROKE, SPARK-IGNITED ENGINE

BACKGROUND OF THE INVENTION

1. Field of the Invention

The present invention relates to an internal combustion engine operating on a six or more stroke cycle. The combustion is divided into two parts: a first lean combustion and a second stoichiometric combustion.

2. Background Art

It is known to those skilled in the art that it is more efficient to operate an engine at an air-fuel ratio which is lean of stoichiometric (i.e., higher air-fuel ratio) rather than at stoichiometric for a comparable speed-torque condition. However, most spark-ignition engines produced, at the present, are stoichiometric engines to facilitate the high efficiency conversion of the regulated emissions: carbon monoxide, hydrocarbons, and nitrogen oxides, in an exhaust aftertreatment device. Engines operating at lean air-fuel ratios often use a reductant to reduce nitrogen oxides within an exhaust aftertreatment device, such as a lean NOx catalyst, with the reductant management and delivery system an undesirable additional requirement on the exhaust aftertreatment system.

The inventors herein have recognized a method for operating an engine with a lean combustion event without incurring the emission aftertreatment difficulties associated with lean combustion. Specifically, a first combustion event occurs without exhausting the lean products of combustion. The valves in the cylinder remain closed during an expansion stroke and a compression stroke. A fuel injector in the cylinder head provides fuel to the combustion gases in the cylinder. The amount of fuel added is an amount to bring the mixture in the combustion chamber to stoichiometry. The mixture undergoes a second combustion process and is subsequently exhausted into an aftertreatment device. Because the gases arriving at the exhaust aftertreatment device are stoichiometric, the exhaust aftertreatment device can convert nitrogen oxides without supplying a reductant.

SUMMARY OF THE INVENTION

A method of operating an internal combustion engine, in which fuel injectors are disposed in the cylinders, is disclosed. The method steps include: inducting air into a cylinder of the engine, compressing the air, providing a first amount of a fuel to the air, combusting the first amount of fuel in air by a first combustion, expanding and compressing products of the first combustion, providing a second amount of fuel to the products of the first combustion, and combusting the second amount of fuel. The first amount of fuel is an amount which when mixed with the air causes the contents of the cylinder to have an air-fuel ratio which is leaner than stoichiometric. The second amount of fuel is an amount which when mixed with the products of the first combustion causes the cylinder to have an air-fuel ratio which is substantially stoichiometric.

An advantage of the present invention is that a first combustion event may be a lean combustion event (may be stratified or homogeneous lean) without the nitrogen oxide emission aftertreatment difficulties associated with lean combustion. This is possible because the products of combustion of the lean combustion are not exhausted after the first combustion event. In the present invention, the products of the lean combustion participate in a second combustion event, which is homogeneous and stoichiometric. A three-way catalyst aftertreatment device being fed stoichiometric exhaust gases is known, by those skilled in the art, to convert the three regulated emissions: carbon monoxide, hydrocarbons, and nitrogen oxides, at high efficiency. In this way, the high efficiency of stratified combustion can be achieved at an acceptable emission level.

A further advantage of the present invention is that the second combustion event occurs within a mixture with a relatively high quantity of hot combustion products. The second combustion produces very low levels of nitrogen oxides.

Yet another advantage of the present invention is that because the second combustion event occurs in a homogeneous, stoichiometric mixture, soot production is negligible.

In an engine equipped with valves which allow fully flexible timing of valve events, load is controlled primarily by valve timing. However, at the lightest loads and speeds, it is found that stoichiometrically fuelled engines require throttling to ensure acceptable combustion stability. Throttling leads to a fuel efficiency penalty. The inventors of the present invention have recognized that by spreading the torque produced over six or more strokes, the power from the engine is reduced without throttling. Thus, the inventors have devised a way to operate the engine in a manner which results in lower torque without incurring pumping losses due to throttling.

Another advantage of the present invention is that inducted air is combusted in two events. The inventors of the present invention have recognized that two small combustion events improve engine smoothness over one large combustion event if compared over the same number of strokes. The ability to have two combustion events without opening the valves is facilitated by providing a fuel injector in communication with the cylinder head, commonly called direct injection. With a direct injection engine, fuel may be provided independently of an air intake process. In contrast, in conventional port injected engines, fuel may be supplied to the cylinder only during an intake process, that is when air carries fuel into the cylinder. The ability of a direct injection engine to supply fuel directly to the combustion chamber provides for combustion of a cylinder's charge of fresh air occurring in two parts.

DETAILED DESCRIPTION OF THE PREFERRED EMBODIMENTS

Figure 1:
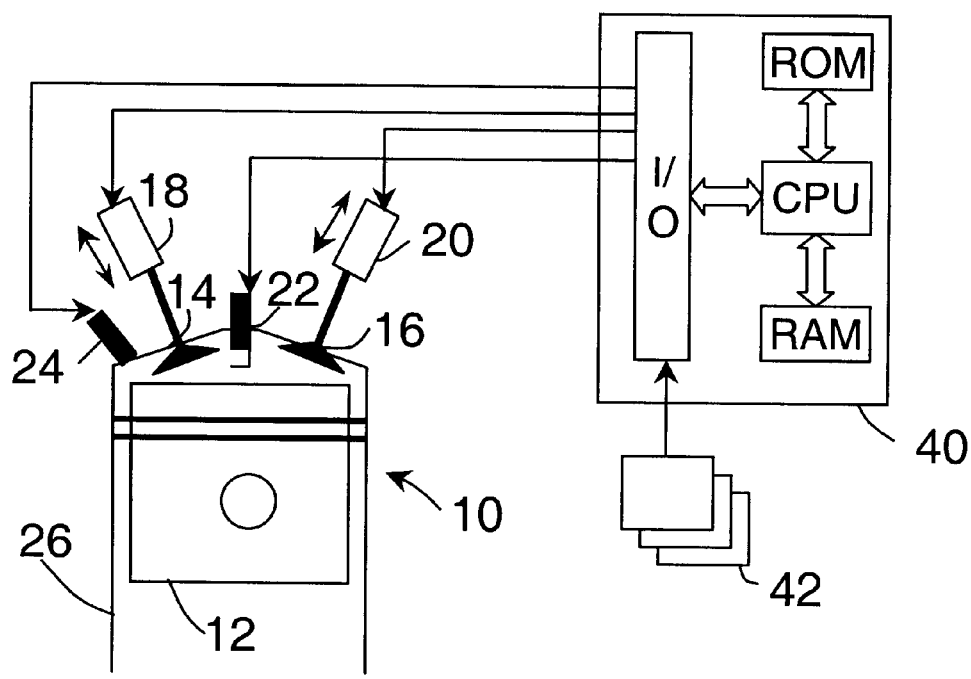
FIG. 1 is a schematic of a single cylinder of an internal combustion engine which may be operated according to aspects of the present invention.

FIG. 1, a single-cylinder of an engine 10 is shown in which the valvetrain has fully flexible events. Intake valve 14 and exhaust valve 16 are actuated electromechanically or electrohydraulically. Intake valve 14 and exhaust valve 16 are opened and closed by actuators 18 and 20, respectively. The fully flexible valves allow the valve events to occur independently of engine angular position. A single piston 12 and cylinder 26 are shown in FIG. 1; however, engine 10 may be a multi-cylinder engine. Coupled to the combustion chamber are a fuel injector 24 and a spark plug 22 to ignite the mixture. The fuel injector 24 is a means for providing fuel to the cylinder in six-stroke operation when the valves remain closed; fuel can be supplied independently of opening the intake valves. The engine control unit 40 receives input from a variety of sensors 42, which may be a mass airflow sensor, temperature sensors, accelerator pedal position, engine rotational speed, and others. Based on the information from the sensors 42, the engine control unit 40 manages the firing of the spark plug 22, the intake valve 14 actuation, the exhaust valve 16 actuation, and the fuel injector 24 actuation.

Figure 2:
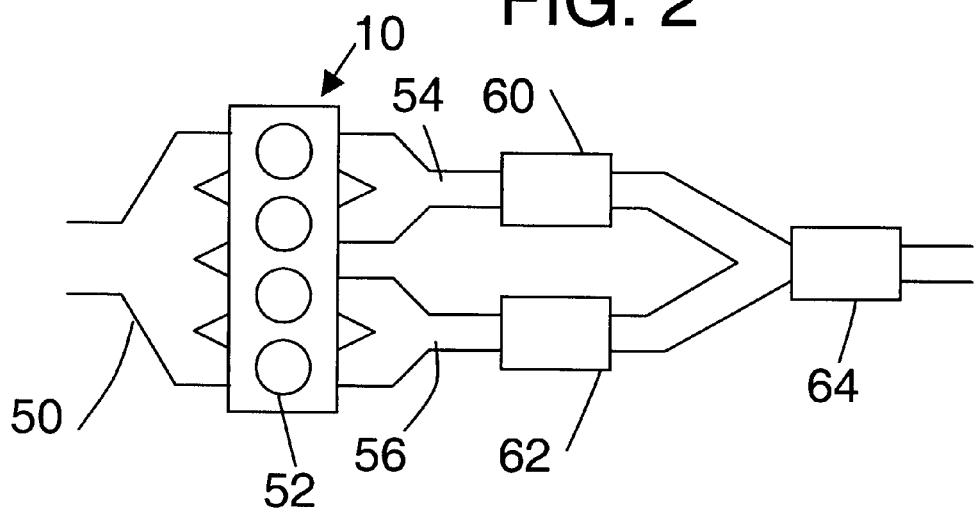
FIG. 2 is a schematic of a multi-cylinder internal combustion engine showing exhaust aftertreatment devices.

Referring now to FIG. 2, four cylinders 52 are disposed in engine 10. FIG. 2 showing four cylinders is merely illustrative as the present invention could be applied to an engine of any number of cylinders. Fresh air is inducted into engine 10 through intake manifold 50. The products of combustion are exhausted through exhaust manifolds 54 and 56 and passed through exhaust aftertreatment devices 60, 62, and 64. Exhaust aftertreatment devices 60 and 62 may be close-coupled, three-way catalysts and exhaust aftertreatment device 64 may be an underbody catalyst, which may also be a three-way catalyst. A three-way catalyst oxidizes hydrocarbons and carbon monoxide and reduces nitrogen oxides. A three-way catalyst reacts most efficiently when the exhaust mixture is very close to a stoichiometric air-fuel ratio. Typically, this is accomplished by providing a stoichiometric air-fuel ratio to the combustion chamber. However, in the present invention, two combustion events are accomplished with the six or more cycles of the process. The first combustion event is at a lean air-fuel ratio. It could be either a stratified or homogeneous air-fuel mixture. A stratified mixture is one in which fuel is added to the air immediately prior to the combustion event to prevent mixing between the fuel and the air. The time elapsing between the fuel addition and ignition is controlled, to obtain the desired fuel and air mixedness. Homogeneous combustion refers to premixed fuel and air. This is achieved by injecting the fuel well before ignition to allow time for the fuel to vaporize and mix with the air. Following the first, lean combustion process, additional fuel is added to the products of combustion of the lean combustion to cause the gases in the combustion chamber to be of stoichiometric proportion. In this way, exhaust aftertreatment devices 60, 62, and 64 receive stoichiometric exhaust products.

Figure 3:
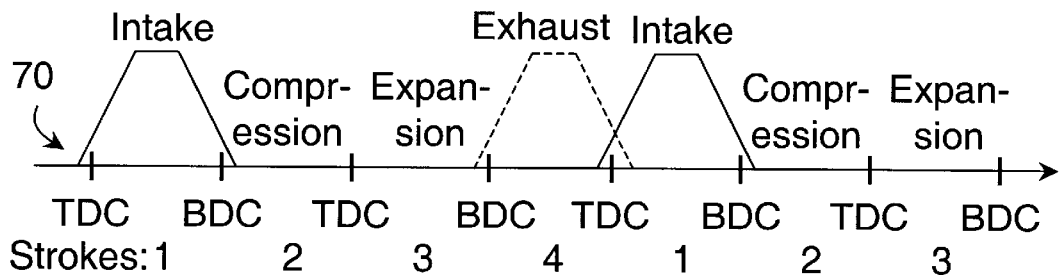
FIG. 3 is a time line of a conventional fourstroke engine of prior art and of a six-stroke engine according to an aspect of the present invention.
Figure 3:
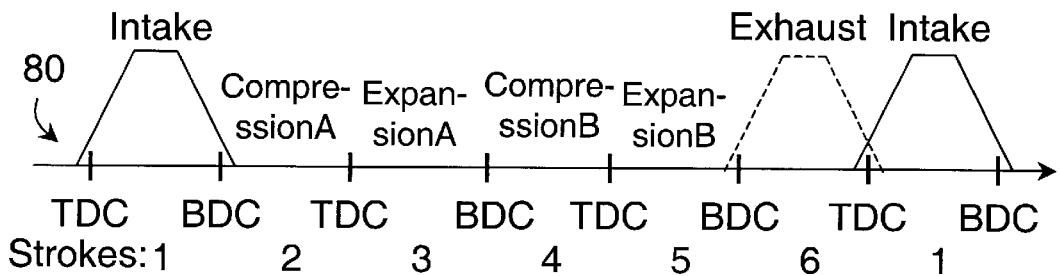

In the upper half of FIG. 3, a conventional four-stroke cycle 70 is shown. During the intake stroke, designated as stroke 1, the piston moves from top dead center (TDC) to bottom dead center (BDC). The trapezoidal intake valve profile indicates that the intake valve is open during stroke 1. As the piston moves from TDC to BDC, air is drawn into the cylinder. Often, the intake valve opens prior to TDC and closes after BDC, as shown in FIG. 3. Stroke 2 is a compression stroke in which the piston moves from BDC to TDC. Combustion is not shown in FIG. 3 because it does not comprise a particular stroke. Instead, it is typically initiated prior to TDC of the compression stroke and continues into the expansion stroke, designated as stroke 3 of FIG. 3. The combustion may be spark or compression ignited and may be of a homogeneous or stratified air-fuel mixture. The exhaust stroke is designated as stroke 4; the dashed trapezoid indicates exhaust valve opening. As the piston moves from BDC to TDC in stroke 4, the products of combustion are pushed out of the cylinder by the piston. Following stroke 4 is an intake stroke, which is designated as stroke 1 as it indicates a repeat of the process described. In the lower section of FIG. 3, a six-stroke cycle 80 is shown. Strokes 1–3 are identical to those discussed in regards to the conventional four-cycle 70 (upper half of FIG. 3), with the distinction that a first combustion, which occurs during the end of compressionA stroke and the beginning of expansionA stroke, is a combustion process which consumes only a portion of the air. The fuel supplied for the first combustion may be injected into the combustion chamber during the compression stroke shortly before the combustion process to provide stratified-charge combustion with the combustion initiated by spark ignition. Alternatively, the fuel may be added prior to the compression stroke to allow the fuel to mix with the air prior to combustion. The first combustion may be a homogeneous-charge compression ignition, which occurs without benefit of spark ignition. Strokes 4 and 5 are a second compression stroke and a second expansion stroke, designated as compressionB and expansionB, respectively, in FIG. 3. A second combustion occurs during the end of compressionB and the beginning of expansionB. Because the fuel that was supplied to support the first combustion was consumed during the first combustion, additional fuel must be added to the unreacted air. The second fuel addition may be accomplished by fuel injector 24 mounted in the cylinder head near the end of expansionA or the beginning of compressionB. The fuel is added to hot combustion products and readily vaporizes. The hot combustion products cause prereaction in the added fuel; the timing of the second fuel addition may be based on ensuring that unwanted, early combustion does not occur. The second combustion may be spark ignited. Alternatively, depending on the operating condition, the second combustion may be compression ignited, which is spontaneous ignition resulting from compression heating of the fuel and air mixture. To achieve high conversion efficiency of the exhaust aftertreatment devices, the second amount of fuel added should be an amount that which, if completely reacted, would consume the fuel and air completely and form only carbon dioxide, water, and nitrogen, thus a stroichiometric mixture. After the exhaust, stroke 6, the cycle begins again with stroke 1, an intake stroke.

In prior approaches using fully flexible valves, it has been found that throttling of the intake, which leads to pumping losses, cannot be avoided at the lowest torque and speed conditions while maintaining acceptable combustion stability. The present invention is an alternative to throttling for reducing torque produced. Instead of having a combustion event every four strokes, as in a typical four-stroke cycle as shown in the upper half of FIG. 3, the strength of a single combustion stroke is separated into two combustion events over six strokes or more, shown in the lower half of FIG. 3. The six-stroke cycle compared to the four-stroke cycle, at equal amount of fuel and air combusted per intake stroke, produces approximately two-thirds the average torque. If an eight-stroke cycle were used, the torque produced would be roughly halved.

The six-stroke cycle can be lengthened to an eight-stroke or more by adding an additional compression and expansion stroke in which no combustion takes place, which may precede or follow compression and expansionsA or follow compressionB and expansionsB, as shown in the lower half of FIG. 3. Similarly, more noncombusting compression and expansion strokes may be inserted to extend the cycle. It may be found that to even out torque pulsations that, for example, each cylinder might be operated on an eight-stroke cycle with an additional compression and expansion strokes inserted in between different strokes in various cylinders.

While several examples for carrying out the invention have been described, those familiar with the art to which this invention relates will recognize alternative designs and embodiments for practicing the invention. Thus, the above-described embodiments are intended to be illustrative of the invention, which may be modified within the scope of the following claims.

What is claimed is:

1. A method of operating an internal combustion engine, said engine has at least one cylinder in which a fuel injector is disposed, said method comprising the steps of:
   inducting air into the cylinder of the engine;
   compressing said air during a first engine compression stroke;
   providing a first amount of a fuel to said air;
   combusting said first amount of said fuel in said air by a first combustion, said first amount of fuel is an amount which when mixed with said air causes contents of the cylinder to have an air-fuel ratio which is leaner than stoichiometric;
   expanding and compressing products of said first combustion during a subsequent expansion and compression stroke;
   providing a second amount of said fuel to said products of said first combustion, said second amount of said fuel is an amount which when mixed with said products of said first combustion causes contents of the cylinder to have an air-fuel ratio which is substantially stoichiometric; and
   combusting said second amount of said fuel by a second combustion.

2. The method according to claim 1, comprising the additional steps of:
   expanding said products of said second combustion; and
   exhausting said products of said second combustion.

3. The method according to claim 1, wherein engine exhaust valves remain closed between said first combustion and said second combustion.

4. The method according to claim 1, wherein said first combustion is initiated by firing a spark plug disposed in the cylinder.

5. The method according to claim 1, wherein said first amount of said fuel is injected into said air during said compressing step.

6. The method according to claim 1, wherein said second combustion is initiated by firing a spark plug disposed in the cylinder.

7. The method according to claim 1, wherein said second amount of said fuel is injected into said products of said first combustion sufficiently prior to said second combustion to provide a substantially homogeneous mixture of said second amount of said fuel and said products of said first combustion.

8. A method for operating an internal combustion engine with the combustion events in each cylinder of the engine being lean every other event and being stoichiometric in between said lean combustion events, the method comprising the steps of:
   providing an amount of air and an amount of fuel to the cylinder, said amount of fuel is less than a stoichiometric amount of fuel;
   combusting said fuel in said air, wherein products of a first combustion are formed;
   providing a second amount of fuel to said products of said first combustion, said second amount of fuel is an amount which causes a mixture of said second amount of fuel and said products of said first combustion to be stoichiometric; and
   combusting said mixture in a second combustion.

9. The method according to claim 8, wherein exhaust valves coupled to the cylinder which communicate exhaust gases out of the cylinder, remain closed between said first combustion and said second combustion.

10. The method according to claim 8, comprising the additional steps of:
    expanding said products of said first combustion prior to said second combustion; and
    compressing said products of said first combustion prior to said second combustion.

11. The method according to claim 8, wherein said first combustion is initiated by firing a spark plug disposed in the cylinder.

12. The method according to claim 8, wherein said second amount of fuel is injected into said products of said first combustion sufficiently prior to said second combustion to provide a substantially homogeneous mixture of said second amount of fuel and said products of said first combustion.

13. An internal combustion engine having at least one cylinder comprising:
    a fuel injector to supply fuel to the cylinder;
    a spark plug coupled to the cylinder; and
    an engine control unit to provide a signal to said fuel injector to provide a first amount of fuel to the cylinder, a signal to said spark plug to initiate a first combustion of said first amount of fuel, and a signal to said fuel injector to provide a second amount of fuel to the cylinder, wherein said second amount of fuel is an amount which when mixed with products of said first combustion causes contents of the cylinder to have an air-fuel ratio which is substantially stoichiometric.

14. The internal combustion engine according to claim 13, wherein said engine control unit controls the engine to perform a cycle comprising:
    an air induction;
    a first compression;
    a first expansion;
    a second compression;
    a second expansion; and
    an exhaust.

15. The internal combustion engine according to claim 13, wherein said engine controller controls engine exhaust valves to remain closed between said first combustion and said second combustion, said engine exhaust valves are coupled to the cylinder.

16. The internal combustion engine according to claim 14, wherein said cycle further comprises:

a third compression; and a third expansion immediately prior to said exhaust step.

17. The internal combustion engine according to claim 14, wherein said engine controller commands said first amount of said fuel to be injected into said air during said first compression step.

18. The internal combustion engine according to claim 13, wherein said engine controller initiates said first combustion occurring during said first compression and said first expansion steps.

19. The internal combustion engine according to claim 13, said second combustion is initiated by firing a spark plug disposed in the cylinder.

20. The internal combustion engine according to claim 13, further comprising an exhaust aftertreatment device to process said products of said combustion, said exhaust aftertreatment device being disposed in a discharge pipe coupled to the engine.

* * * * *